March 1, 1955  A. W. KOON  2,703,300
PLASTIC-COVERED ROPE SPLICE AND METHOD OF MAKING SAME
Filed Jan. 30, 1953
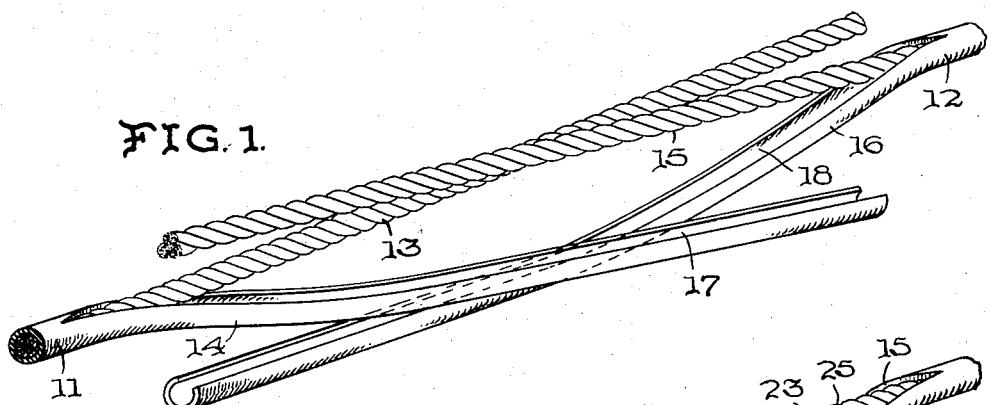
FIG. 1.
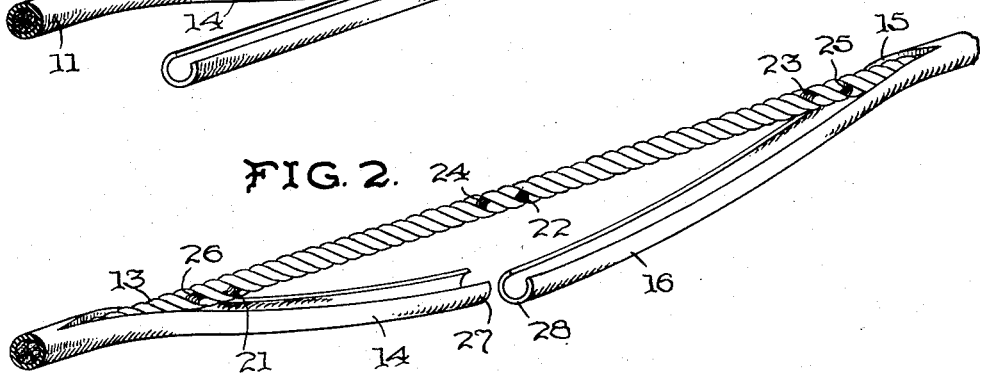
FIG. 2.
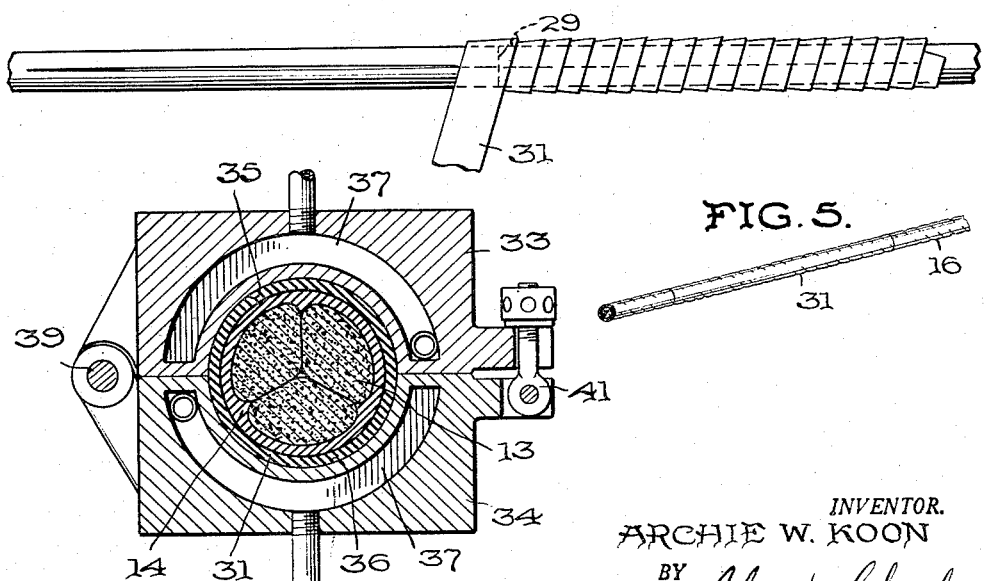
FIG. 3.
FIG. 5.
FIG. 4.
INVENTOR.
ARCHIE W. KOON
BY
*Church Church*
HIS ATTORNEYS

United States Patent Office 2,703,300
Patented Mar. 1, 1955

2,703,300

PLASTIC-COVERED ROPE SPLICE AND METHOD OF MAKING SAME

Archie W. Koon, Auburn, N. Y., assignor to Columbian Rope Company, Auburn, N. Y., a corporation of New York Application January 30, 1953, Serial No. 334,332

7 Claims. (Cl. 154—116)

This invention relates to a splice for a rope having a plastic covering and the method of splicing separate lengths of such rope into a single plastic-covered rope.

Particularly where plastic-covered rope is used as a center for a wire rope, such as that disclosed in Patent No. 2,184,502, granted December 26, 1939, upon an application of Frank R. Metcalf, it is important that the splice of the plastic-covered twisted rope include a splice of the strands of the rope and in addition a unification of the plastic jackets surrounding the spliced ends of the two rope lengths. Often, in the manufacture of wire rope, the length of the wire rope exceeds the length of the available plastic-covered wire rope center. In order that the length of the wire rope will not be limited by the length of the center, it is essential that the ends of separate lengths of wire rope center be joined together. Also, to avoid excessive wear of the wire rope at the point where the center is spliced, it is important that the plastic covering be substantially uniform over the area of the splice, and that it be approximately the same as the covering over other parts of the wire rope center.

It is, therefore, a major object of this invention to provide a splice for the ends of separate lengths of a plastic-covered rope wherein the twisted rope center is spliced into a continuous length and the plastic covering is formed into an uninterrupted jacket extending over the area of the splice.

Another object of this invention is to provide the method of splicing two lengths of a plastic-covered rope into a unitary plastic-covered rope with the plastic jacket extending uninterruptedly over the area of the splice of the twisted rope strands.

In the attainment of these objects, one important feature of the invention resides in the arrangement of the abutting ends of the plastic jackets for the respective lengths of rope to cover the area of the splice, with a wrapping of thermoplastic material surrounding the plastic covering in the area of the splice and fused by heat and pressure to form an uninterrupted covering or jacket along the length of the rope. More particularly, a feature of the invention resides in the slitting of the ends of the plastic covering of the rope to be joined, to expose the ends of the twisted rope and permit the intertwining of the strands to form a splice; the replacement of the plastic covering to cover the area of the splice; the arrangement of a plastic wrapping about the slit plastic covering to fill the crevices; and the fusing of the covering by the application of heat and pressure to form an uninterrupted jacket for the rope.

These and other objects and advantages of the invention will become apparent from the following specification taken in conjunction with the accompanying drawings wherein:

Fig. 1 is a perspective view showing the ends of the two lengths of rope to be joined with the slit covering exposing the ends of the rope to be spliced;

Fig. 2 is a similar view but showing the twisted strands of the rope lengths intertwined in a conventional splice;

Fig. 3 is a plan view of the spliced rope showing the application of plastic wrapping material;

Fig. 4 is a cross-sectional view of a mold in which the wrapped area of the splice is subjected to heat and pressure; and Fig. 5 is a plan view of the completed splice.

As illustrated in Fig. 1, two lengths of rope 11 and 12 have ends which are to be spliced. The length of rope 11 has a twisted rope core 13 which may be of vegetable or synthetic fiber and is provided with a plastic covering 14 which may be a covering similar to that disclosed in the aforementioned Metcalf patent, but preferably is formed of a more satisfactory material such as the polychloroprene, butadiene-acrylonitrile copolymers, vinyl chloride polymers, and nylon compounds such as are disclosed in my copending application Serial No. 316,705, filed October 24, 1952. Rope length 12 correspondingly is made of a twisted strand core 15 and a plastic covering or jacket 16.

In order to expose lengths of the rope centers which may have their twisted strands intertwined to form a splice, the end portions of the plastic jackets 14 and 16 are slit longitudinally as at 17 and 18. Then, in accordance with standard splicing procedure, lengths of two of the strands forming each of the rope lengths 13 and 15 are shortened different distances and intertwined with the remaining strands of the other section of rope. Thus, one strand 21 of rope 13 is terminated at the beginning of the splice area and a second strand 22 of the rope 13 is terminated at a point intermediate the length of the splice area. Correspondingly, strands 23 and 24 of the rope 15 are terminated at the beginning and intermediate points of the splice area. This leaves, for the rope 13, a single strand 25 extending the full length of the splice area, and a corresponding single strand 26 for the rope 15. Strands 25 and 26 are intertwined the full length of the splice area while strands 22 and 24 are intertwined only half of the length. The ends of all strands are then tucked under adjoining convolutions of other strands to form the completed splice. Of course, this intertwining of strands leaves excess material of the jackets 14 and 16 which must be trimmed so the ends 27 and 28 of the respective jackets will abut one another, as indicated at 29 in Fig. 3, when the slit portions are arranged to recover the spliced ends of the rope center.

When this part of the splice has been completed, the twisted fiber core of the rope has a tensile strength approximating that of a unitary rope structure, all in accordance with conventional splicing procedure. In addition, the plastic covering extends substantially continuously along the splice area except that it has longitudinal slits and a central circumferential break.

In order to unify the plastic covering to provide a substantially uniform plastic jacket or sheath for the rope, which is particularly important in the case of a wire rope center in order to provide a uniform central support for the wire strands and also avoid excessive wear of the wire rope strands, a sheet of plastic material corresponding to the plastic material of the jacket is wrapped about the splice area. As illustrated in Fig. 3, this plastic wrapping preferably is in the form of a tape 31 and is preferably helically wrapped with overlapping convolutions along the entire length of the splice area and actually extending slightly beyond the slit parts of the plastic jackets 14 and 16.

In its preferred form, the plastic tape 31 is a thermoplastic material corresponding to or compatible material with the plastic covering for the rope. Once the plastic wrapping has been applied about the splice area, the wrapped splice is placed in a mold such as that illustrated in Fig. 4. This mold is made of two parts 33 and 34 having complementary cavities 35 and 36 forming a bore of a diameter slightly larger than the diameter of the plastic-covered rope which is being spliced. Heat may be supplied through suitable channels 37 and 38 and the two mold parts may be hinged at 39 and pressure applied as by a conventional bolt clamp 41. Application of heat and pressure to the wrapped plastic-covered rope, along the entire splice area, causes the thermoplastic wrapping to fill the crevices in the slits 17 and 18 and also the abutting ends at the abutment line 29. Then, upon cooling, the wrapping is fused with the plastic covering and forms a substantially continuous and uninterrupted plastic sheath for the rope extending throughout the splice area and beyond in both directions.

In view of the fact that only a simple portable mold or die is necessary, this entire operation may be carried out on the spot where the splice is to be made. Actually, the operations can be performed very quickly because the plastic coverings may be slit manually, the splice made by conventional rope splicing technique, and the wrapping of the plastic tape accomplished all in a very short time. Then, the splice is completed by applying heat and pressure for such time as is necessary to cause the thermoplastic wrapping to flow and fill the crevices and form a smooth continuous plastic cover fused with the original covering of the rope. In cases where the plastic-covered rope is used as a wire rope center, the twisting of the wire rope about the center may be continued without undue interruption by successively splicing lengths of the wire rope center.

Having thus decribed the invention, what is claimed as new and desired to secure by Letters Patent is:

1. The method of splicing lengths of a plastic-covered twisted rope which comprises slitting longitudinally the end portions of the plastic coverings to expose the ends of the rope lengths to be spliced, splicing together the exposed ends of the rope by intertwining the respective strands thereof, recovering the spliced ends with the slit coverings, wrapping thermoplastic sheet material about the slit coverings in the area of the splice, and heating the wrapped material under pressure to fuse the wrapped material and plastic coverings into a continuous jacket for the rope.

2. The method of splicing lengths of plastic-covered twisted rope which comprises slitting longitudinally the end portions of the plastic coverings to expose the ends of the rope lengths to be spliced, splicing together the exposed ends of the rope by intertwining the respective strands thereof, recovering the spliced ends with the slit coverings, helically wrapping a tape of thermoplastic sheet material in overlapping relation about the slit coverings in the area of the splice, and heating the wrapped material under pressure to fuse the wrapped material and plastic coverings and thereby form an uninterrupted jacket for the rope.

3. The method of splicing lengths of plastic-covered twisted rope which comprises slitting longitudinally the end portions of the plastic coverings to expose the ends of the rope lengths to be spliced, splicing together the exposed ends of the rope by intertwining the respective strands thereof, recovering the spliced ends with the slit coverings, wrapping thermoplastic sheet material about the slit coverings in the area of the splice, and heating the wrapped material under pressure in a mold to fuse and mold the wrapped material and plastic coverings into an uninterrupted jacket for the rope.

4. The method of splicing lengths of a plastic-covered twisted rope which comprises slitting longitudinally the end portions of the plastic coverings to expose the ends of the rope lengths to be spliced, splicing together the exposed ends of the rope by intertwining the respective strands thereof, recovering the spliced ends with the slit coverings, helically wrapping a tape of thermoplastic sheet material in overlapping relation around the slit coverings in the area of the splice, and heating the wrapped material in a mold under pressure to mold and fuse the wrapped material and plastic coverings into an uninterrupted jacket for the rope.

5. The method according to claim 1 wherein excess material of the plastic coverings is removed and the ends of the slit coverings are replaced in abutting relation.

6. A spliced section of plastic-covered twisted rope comprising separate lengths of twisted rope having intertwined strands forming a splice, separate plastic jackets covering the respective rope lengths and having abutting ends, and a wrapping of plastic material surrounding the abutting end portions of the jackets and fused thereto to provide an uninterrupted plastic covering about the rope.

7. A spliced section of plastic-covered twisted rope comprising separate lengths of twisted rope having intertwined strands forming a splice, separate plastic jackets covering the respective rope lengths and having abutting ends, and a wrapping of plastic material surrounding the abutting end portions of the jackets and filling the crevices between said end portions and along longitudinal slits therein, said wrapping being fused to said jacket to form an uninterrupted plastic covering about the rope.

References Cited in the file of this patent

UNITED STATES PATENTS

| | | |
|---|---|---|
| 1,656,258 | Yale | Jan. 17, 1928 |
| 1,724,823 | Carney | Aug. 13, 1929 |
| 2,184,502 | Metcalf | Dec. 26, 1939 |
| 2,454,417 | Zerr | Nov. 23, 1948 |
| 2,558,553 | Hansen et al. | June 26, 1951 |
| 2,596,513 | Tocci-Guilbert | May 13, 1952 |